UNITED STATES PATENT OFFICE.

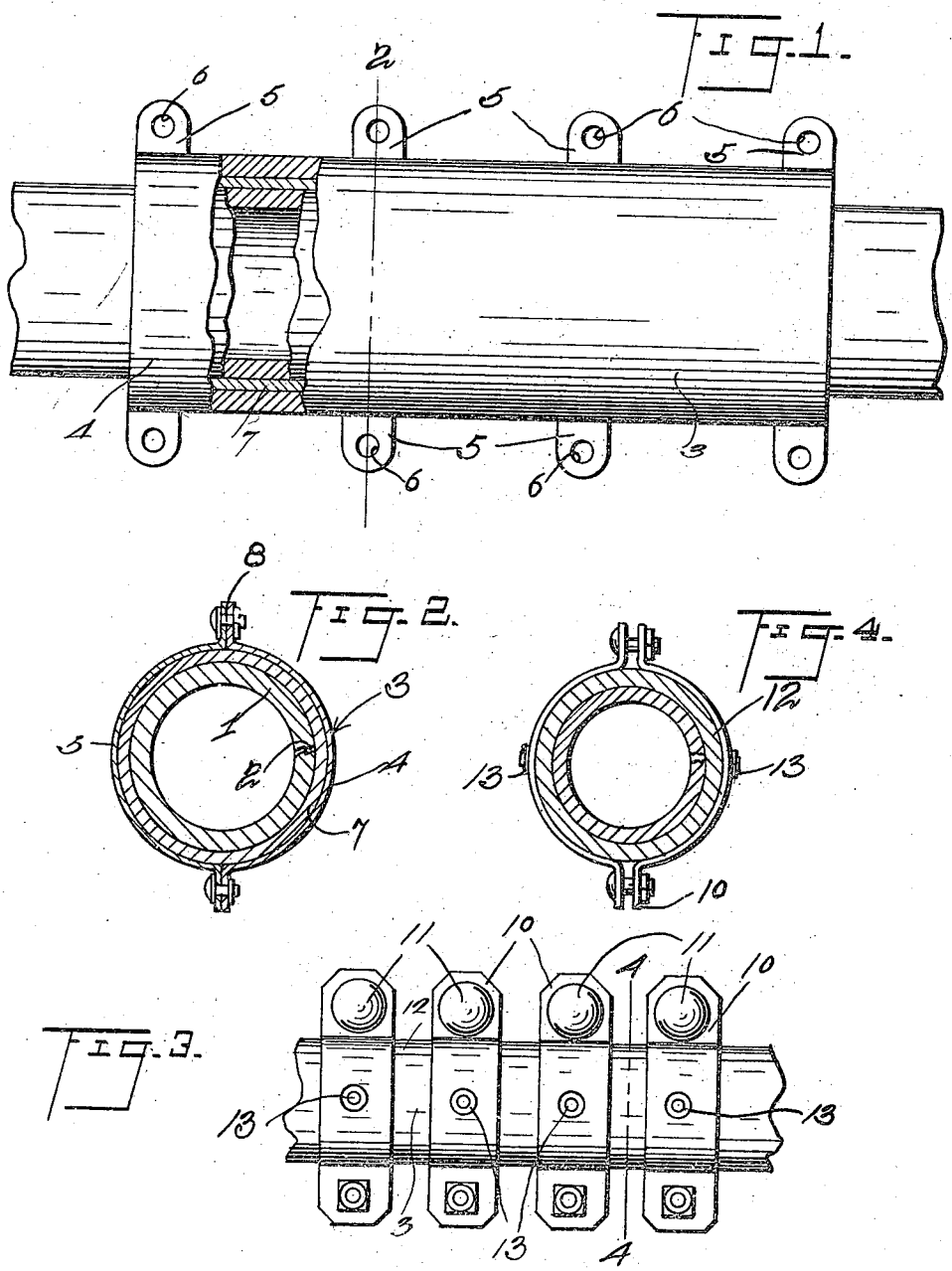

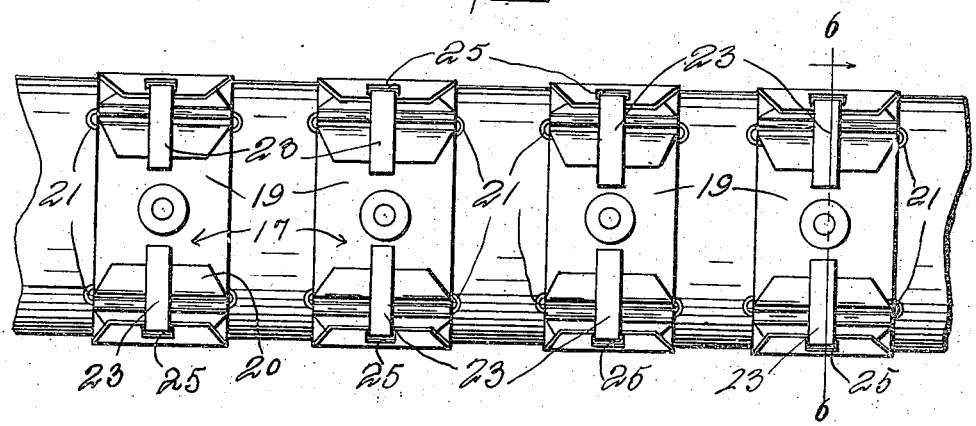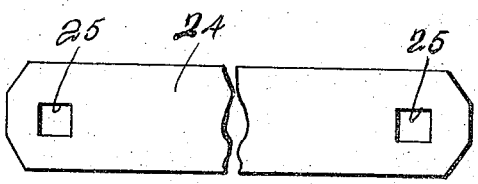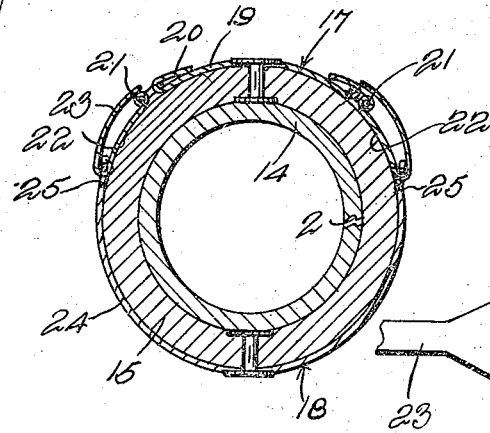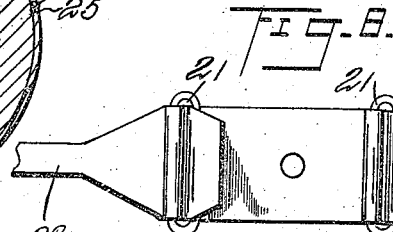

FRANK C. SMAKAL, OF MIDAS, NEVADA.

PIPE-PATCH.

1,242,060.   Specification of Letters Patent.   Patented Oct. 2, 1917.

Application filed July 29, 1914. Serial No. 853,863.

*To all whom it may concern:*

Be it known that I, FRANK CIRRIL SMAKAL, a citizen of the United States, residing at Midas, in the county of Elko and State of Nevada, have invented certain new and useful Improvements in Pipe-Patches; and I do hereby declare the following to be a full, clear, and exact description of the invention, such as will enable others skilled in the art to which it appertains to make and use the same.

This invention relates to new and useful improvements in pipe patches, and has for its principal object to provide a device which may be secured to a broken pipe to prevent the same from leaking.

Another object of the invention is to provide a device which is capable of being secured to any ordinary pipe without the necessity of using any fastening means other than that carried by the pipe.

A further object of the invention is to provide a pipe patch which is capable of being secured to a hose or other flexible pipe should the same become broken or leaking.

With these and other objects in view, the invention consists in the novel combination and arrangement of parts which will be fully set forth in the following specification and accompanying drawings, in which, Figure 1 is a side view of a pipe patch constructed in accordance with this invention showing a portion broken away to more clearly illustrate the details of construction, Fig. 2 is a transverse sectional view taken on line 2—2 of Fig. 1, Fig. 3 is a view of a patch which is adapted to be secured to a flexible pipe, Fig. 4 is a transverse sectional view taken on line 4—4 of Fig. 3, Fig. 5 is a side view in elevation of a modified form of flexible patch, Fig. 6 is a transverse sectional view taken on line 6—6 of Fig. 5, Fig. 7 is a detail view of one of the locking devices used in conjunction with Fig. 5, and Fig. 8 is the coöperating locking device.

Referring now to the drawings by characters of reference, the numeral 1 designates the pipe which is split or broken as at 2, while the numeral 3 designates as an entirety the patch. This patch comprises the outer casing 4 having formed thereon at spaced intervals along its lateral extremities the ears 5, which are provided with the apertures 6 which are arranged to coöperate with each other in holding the patch in place. This patch is provided with a suitable waterproof lining 7 which is arranged to lie against the pipe to form a water-tight joint. The outer casing 4 is preferably formed of the two semicylindrical members illustrated in Fig. 2, and it will be apparent that when the same is in use the ears 5 are positioned so that the apertures 6 aline, thus permitting the bolts 8 to be passed therethrough and firmly clamp the whole together.

In the modified form of the invention, which is illustrated in Figs. 3 and 4, the outer casing is eliminated and a plurality of strips 9 substituted therefor. Each of these strips is semicircular as shown in Fig. 4 and provided with the ears 10 through which the bolts 11 extend. A suitable waterproofing material 12 is provided and these strips 9 are riveted or otherwise secured as at 13 to the waterproofing material 12 as illustrated in Fig. 3.

In the modified form which is illustrated in Figs. 5 and 6, the pipe is designated by the numeral 14 and is surrounded by the flexible waterproofing material 15. This waterproofing material has riveted thereto at diametrically opposite points the coöperating locking means 17 and 18, which comprise respectively the strip 19 which is turned back at its ends as at 20 for holding the loop 21 in place. This loop 21 has connected thereto the hook member 22 which is provided with the reduced portion 23. The coöperating member 18 comprises the flat strip of material 24 having formed near its end the aperture 25 through which the reduced extension 23 of the member hereinbefore referred to, extends. It will thus be seen that when in use, the extensions are passed through their respective apertures and bent back as illustrated in Fig. 6, thus firmly holding the whole together.

While in the foregoing there has been shown and described the preferred embodiment of this invention, it is to be understood that such changes may be made in the combination and arrangement of parts as will fall within the spirit and scope of the invention as defined in the appended claims.

Having thus described my invention, I claim:

1. A pipe patch comprising a flexible water proof sleeve, strips secured to the flexible casing, one set of strips extending around said flexible water proof sleeve and having their ends spaced, said ends being provided with apertures, the opposite set of strips being secured to said sleeve intermediate the ends of said first mentioned strips, hooks carried by said second mentioned strips and arranged to enter the apertures and thus firmly clamp the whole together.

2. A pipe patch comprising a flexible water proof sleeve, strips secured to the flexible casing, one set of strips extending around said flexible water proof casing and having their ends spaced, said ends being provided with apertures, the opposite set of strips being secured to said sleeve intermediate the ends of said first mentioned strips, hooks pivotally secured to the second mentioned strips, reduced extensions formed on said hooks, said reduced extensions arranged to enter the apertures and thus firmly clamp the whole together.

In testimony whereof I affix my signature in presence of two witnesses.

FRANK C. SMAKAL.

Witnesses:
R. T. NOBLE,
J. K. CAMPBELL.

Copies of this patent may be obtained for five cents each, by addressing the "Commissioner of Patents, Washington, D. C."